(12) United States Patent
Yamanaka

(10) Patent No.: US 6,443,865 B1
(45) Date of Patent: Sep. 3, 2002

(54) BICYCLE FRONT CHAINWHEEL ASSEMBLY

(75) Inventor: Masahiro Yamanaka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/986,083

(22) Filed: Nov. 7, 2001

Related U.S. Application Data

(62) Division of application No. 09/528,192, filed on Mar. 17, 2000.

(51) Int. Cl.[7] ............................ F16H 57/02; F16H 55/30
(52) U.S. Cl. ......................................... 474/144; 474/160
(58) Field of Search ............................... 474/144, 145, 474/146, 160

(56) References Cited

U.S. PATENT DOCUMENTS

| | | | | |
|---|---|---|---|---|
| 504,121 A | * | 8/1893 | Cheeseman | 474/144 |
| 877,820 A | * | 1/1908 | Badger | 474/144 |
| 1,136,411 A | * | 4/1915 | Davis | 74/609 |
| 3,815,439 A | * | 6/1974 | Tarutani | 474/144 |
| 3,835,729 A | * | 9/1974 | Tarutani | 474/144 |
| 4,009,621 A | * | 3/1977 | Segawa | 474/160 |
| 4,044,621 A | * | 8/1977 | McGregor, Sr. et al. | 474/144 |
| 4,106,357 A | * | 8/1978 | Segawa | 474/160 |
| 4,475,894 A | | 10/1984 | Sugino | |
| 5,003,840 A | | 4/1991 | Hinschlager | |
| 5,320,583 A | * | 6/1994 | Van Wingen Born Looyen | 474/144 |
| 5,326,331 A | * | 7/1994 | Hallock, III | 474/144 |
| 6,024,662 A | * | 2/2000 | Fujimoto | 474/144 |

FOREIGN PATENT DOCUMENTS

| | | |
|---|---|---|
| FR | 1256502 | 2/1961 |
| JP | 5633828 Y2 | 8/1981 |

* cited by examiner

Primary Examiner—David A. Bucci
Assistant Examiner—Colby Hansen
(74) Attorney, Agent, or Firm—Shinjyu Global IP Counselors, LLP

(57) ABSTRACT

A bicycle front chainwheel assembly is provided that includes a protective cover. The front chainwheel assembly basically includes a crank arm, one or more chainrings and the protective cover. The crank arm includes a hub portion, a crank portion and four fastening finger portions. The free ends of the fastening finger portions are provided with chainring attachment points for attaching the cover thereto. The cover is attached to the fastening finger portions by fasteners that have a shaft extending substantially perpendicular to the axis of rotation of the front chainwheel assembly.

9 Claims, 11 Drawing Sheets

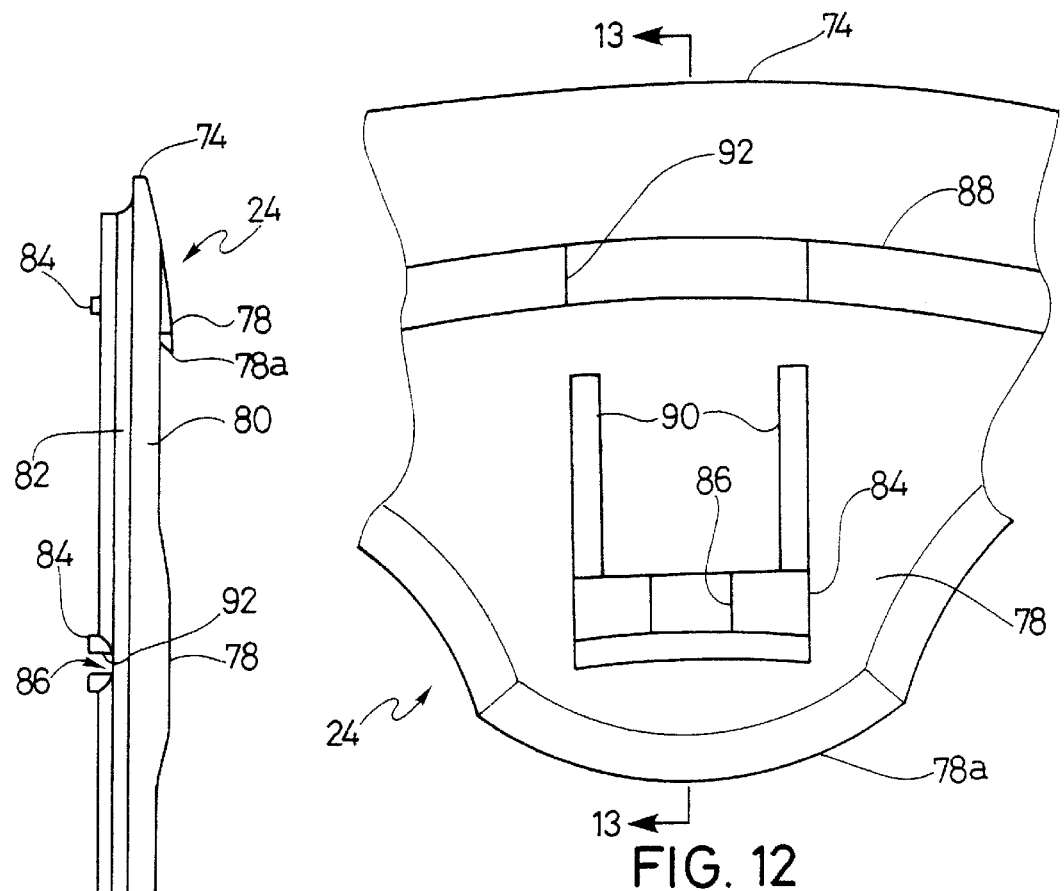

BICYCLE FRONT CHAINWHEEL ASSEMBLY

This application is a division of application Ser. No. 09/528,192, filed Mar. 17, 2000.

BACKGROUND OF THE INVENTION

1. Field of the Invention

The present invention generally relates to a bicycle front chainwheel assembly which fixedly couples a bicycle pedal to the bicycle bottom bracket and supports one or more chainrings thereon. More specifically, the present invention is directed to a protective cover that is coupled to the front chainwheel.

2. Background Information

Bicycling is becoming an increasingly more popular form of recreation as well as a means of transportation. Moreover, bicycling has also become a very popular competitive sport. Whether the bicycle is used for recreation, transportation or competition, the various bicycle components are constantly being improved to increase performance and/or safety. Moreover, bicycle components are constantly being designed so as to be more durable and attractive. One particular portion of a bicycle that has been extensively redesigned over the past years is the drive train of the bicycle.

The drive trains of most of today's bicycles have multiple speeds that allow the rider to select the appropriate gear ratio to suit the particular riding conditions encountered during the bicycle ride. One of the most popular types of gearing assemblies for multi-speed bicycles utilize a chain extending between a set of front chainrings or chainwheels, and a set of rear gears or sprockets mounted on the rear hub of the rear bicycle wheel. Two derailleurs are typically used to move the chain between the chainrings or sprockets. The pedals are coupled to the front chainrings or for rotation therewith by a pair of bicycle crank arms coupled to a bottom bracket. The crank arms extend outwardly from the bottom bracket in opposite directions and have pedals attached to their free ends for supporting the rider's feet. Rotation of the pedals by the rider causes the chainrings to rotate which in turn moves the bicycle chain to rotate the rear sprockets, and thus, rotate the rear wheel of the bicycle. In certain crank arm designs, the front chainrings are coupled directly to the crank arm by fastening finger portions. The fastening finger portions are coupled to the hub portion of the crank arm, and extend radially outwardly from the hub portion of the crank arm.

One problem with these types of drive trains is that the rider's clothing can either get caught in-between the chain and the chainring, or the rider's clothing can become dirty from contacting these chains. Another problem with these types of chain drives is that the chain can pop off of the chainring due to improper adjustment of the drive train.

To overcome these problems, bicycle manufactures have provided a protective cover or guard for the driving sprocket of a bicycle. Usually, such covers or guards have been made of resin or some other soft material. It is very difficult to manufacture a protective cover or guard made of a soft material with precise dimensions. Even if the protective cover or guard is manufactured with very precise and accurate dimensions, the soft material of the protective cover can be easily distorted or damaged by heat, pressure or other environmental factors. Thus, prior protective covers tend to be constructed without precise and accurate dimensions. This often results in wobbling of the conventional protective cover. In particular, if one portion of the protective cover is distorted for some reason, when it is attached to the front chain wheel, the distorted portion (usually one of the corners) can be lifted up even though both of the bolts are securely fixed to the front chain wheel.

One method to overcome this problem is to construct the protective cover from a heavy, rigid metallic material. However, this is very undesirable since bicycles should be constructed as lightweight as possible. Other attempts to overcome this problem have resulted in very unattractive protective covers and/or protective covers that limit the design options for the crankset.

Most protective covers or guards are fixed to the front chainwheel by bolts extending in a direction relatively parallel to the axis of rotation of the chainwheel. Thus, these prior art types of protective covers cannot be adjusted in the axial direction to correct for wobbling. Moreover, when the prior art protective covers become distorted, they often result in a very unattractive appearance. Also, the fasteners are often located on the front or outer surface of the front chainwheel, which results in a less attractive appearance. In particular, it is desirable to create a front chainwheel that has a very smooth attractive appearance without the fasteners being seen on the front surface.

Another problem with many prior art protective covers or guides is that the attachment points for the protective cover limit the design of the fastening fingers and/or the chainring. In particular, it is desirable to have a front chainwheel with a protective cover that has the same degree for freedom for design as a front chainwheel that does not have a protective cover.

In view of the above, there exists a need for a front chainwheel assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide a protective cover, which is attractive as well as provide proper protection for the chainrings and the chain.

Another object of the present invention is to provide a front chainwheel assembly that is relatively easy to install and to adjust for avoiding wobbling of the cover.

Another object of the present invention is to provide a front chainwheel assembly that has a smooth transition between the front surfaces of the cover and the fastening finger portions.

Another object of the present invention is to provide a front chainwheel assembly that allows for more freedom of design of the crankset.

Another object of the present invention is to provide a cover for a front chainwheel assembly which is relatively easy and inexpensive to manufacture.

Still another object of the present invention is to provide a bicycle front chainwheel assembly which is lightweight and strong.

The foregoing objects can basically be attained by providing a bicycle front chainwheel assembly having a bicycle front chainwheel assembly comprising a hub portion configured to be coupled to a bottom bracket for rotation therewith about an axis of rotation; a crank portion having an inner end coupled to the hub portion and an outer free end adapted to be coupled to a pedal; and a plurality of fastening finger portions extending radially outwardly from the hub portion to free ends, each of the fastening finger portions having a chainring attachment point; and a cover coupled to the fastening finger portions by fasteners having a shaft portion extending substantially perpendicular to the axis of rotation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a side elevational view of the cover illustrated in FIGS. 2–4, 9 and 10;

FIG. 12 is an enlarged, partial rear side or inside elevational view of a portion of the cover, illustrated in FIGS. 9–11;

FIG. 13 is an enlarged, partial cross-sectional view of a portion of the cover illustrated in FIGS. 9–12 as viewed along section line 13—13 of FIG. 12;

FIG. 14 is an enlarged, partial edge elevational view of the cover and one of the fasteners illustrated in FIGS. 9–13 as viewed along the axis C of FIG. 4;

DETAILED DESCRIPTION OF THE PREFERRED EMBODIMENTS

Figure 1:
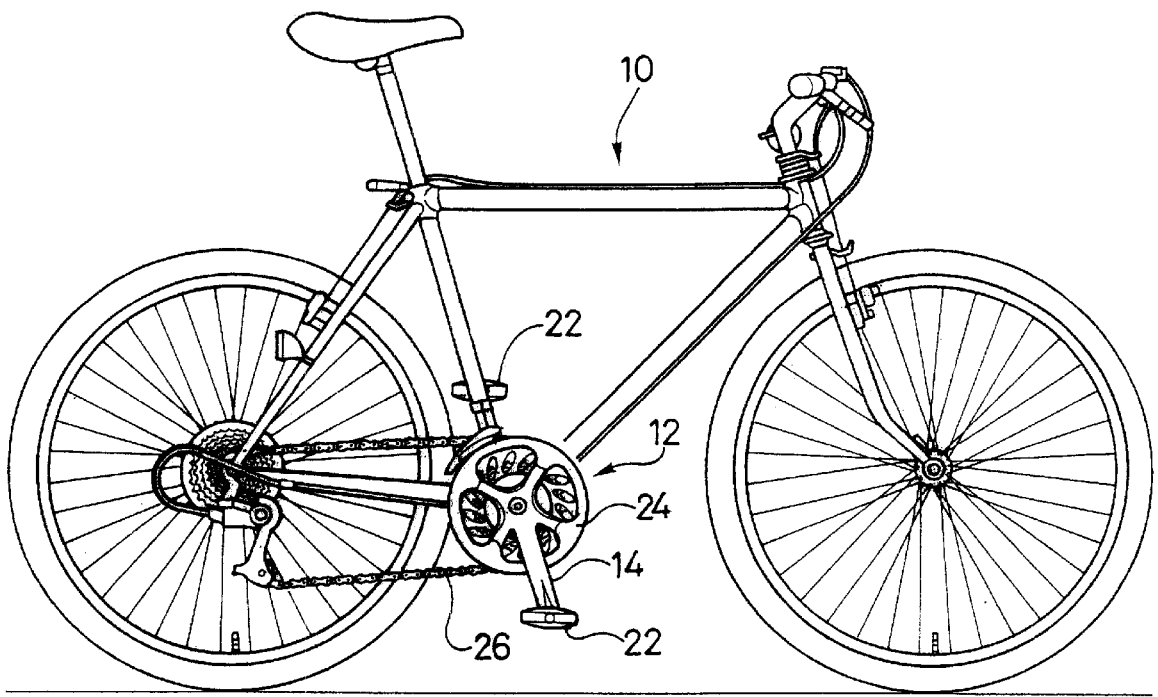
FIG. 1 is a side elevational view of a conventional bicycle using a front chainwheel assembly in accordance with the present invention.
Figure 2:
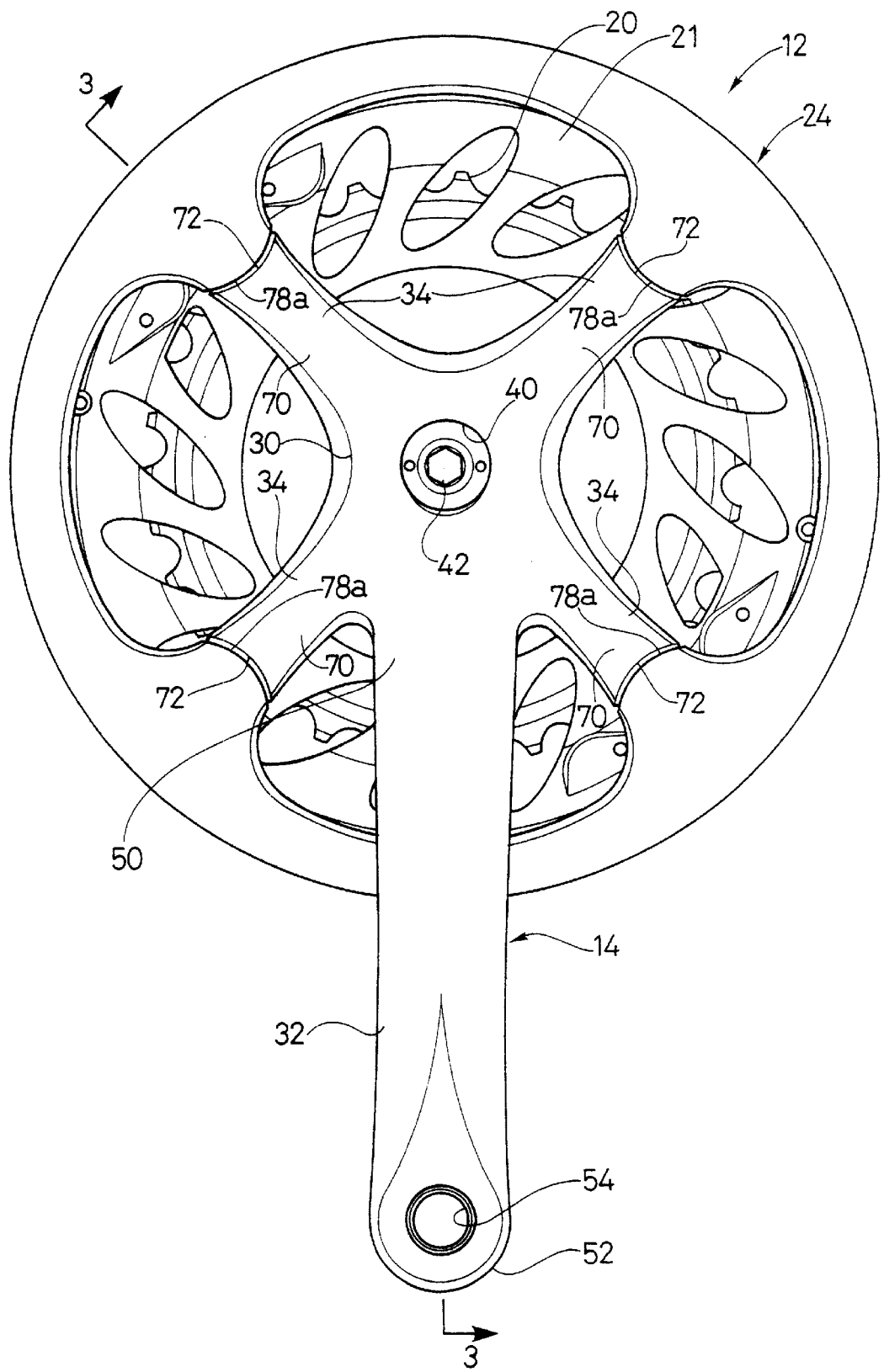
FIG. 2 is an outside elevational view of the front chainwheel assembly in accordance with the present invention with two chainrings fixedly coupled to the crank arm to form a crank set.

Referring initially to FIGS. 1 and 2, a conventional bicycle 10 is illustrated having a crankset 12 in accordance with the present invention. Bicycles and their various components are well known in the prior art, and thus, bicycle 10 and its various components will not be discussed or illustrated in detail herein, except for the components that relate to the present invention. In other words, only the crankset 12 will be discussed and illustrated in detail herein.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies. For example, the phrase "substantially parallel" as used herein can include two axes or two planes that deviate by 10°, but would not include 23° and the phrase "substantially perpendicular" as used herein can include two axes or two planes that are angled 70° apart, but would not include 23°.

Basically, the crankset 12 includes a pair of crank arms 14 and 16, a bottom bracket 18 connecting the crank arms 14 and 16 together, and a pair of front chainrings or chainwheels 20 and 21. The free ends of the crank arms 14 and 16 are provided with pedals 22. The crank arms 14 and 16, the bottom bracket 18, the front chainrings 20 and 21 and the pedals 22 are relatively conventional components, which are well known in the art. Thus, these components will not be discussed in detail herein, except as they are modified to carry out the invention. A protective cover 24 is coupled to the crankset 12 to prevent the rider's clothing from touching the chainrings 20 and 21 or the chain 26 from suddenly dropping off the gear teeth of the chainrings 20 and 21.

Figure 3:
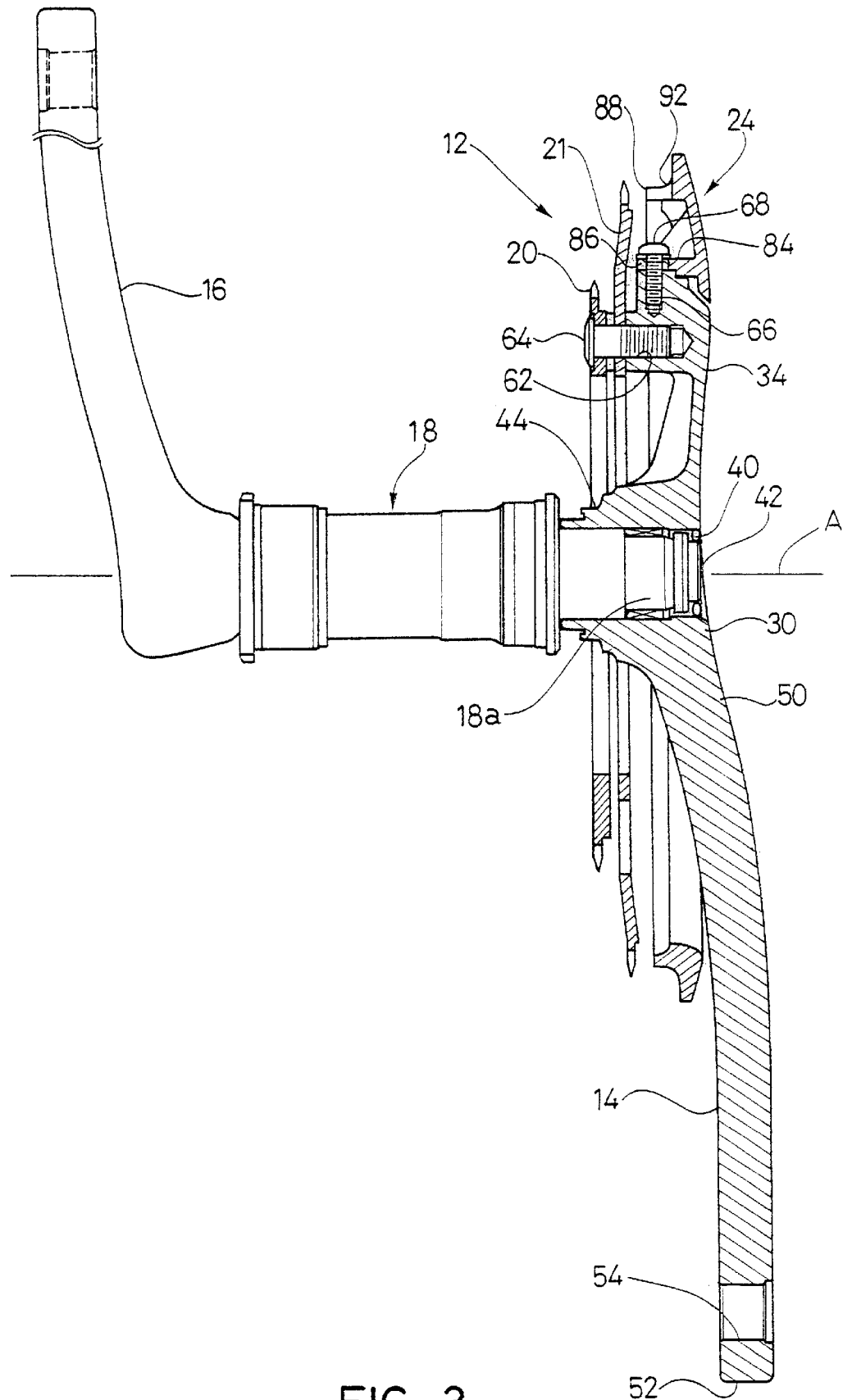
FIG. 3 is a partial end elevational view of the front chainwheel assembly illustrated in FIGS. 1 and 2 coupled to a bottom bracket and with certain parts shown in cross-section for the purposes of illustration.
Figure 4:
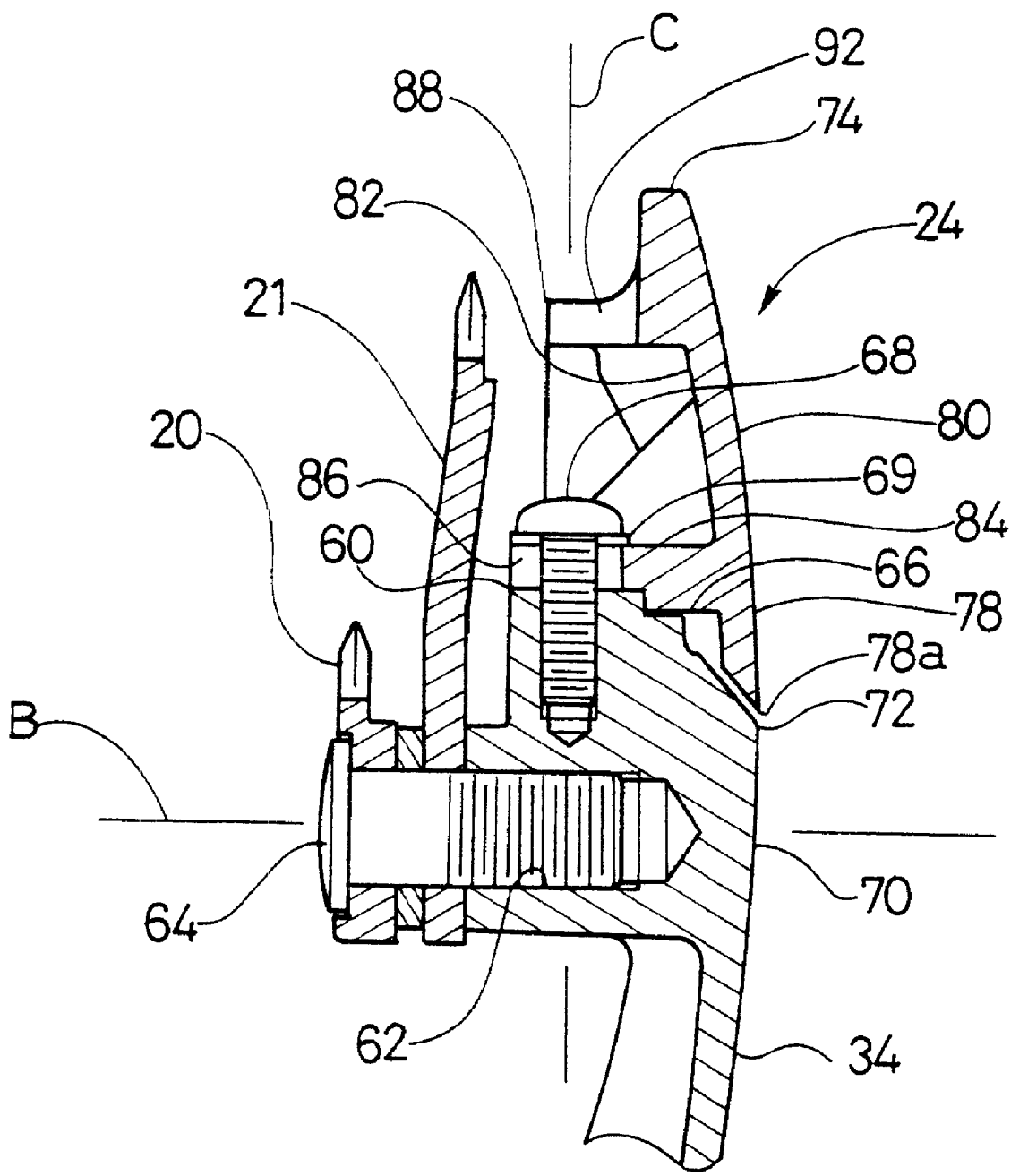
FIG. 4 is an enlarged, partial cross-sectional view of one of the fastening finger portions of the crank arm coupled to the cover illustrated in FIGS. 2 and 3.

Referring now to FIGS. 2–4, the front chainwheel assembly of the present invention is basically formed of the crank arm 14, the chainrings 20 and 21 and the cover 24. The crank arm 14 includes a hub portion 30, a crank portion 32 extending radially outwardly from the hub portion 30, and four fastening finger portions 34 extending radially outwardly from the hub portion 30. Preferably, the hub portion 30, the crank portion 32 and the fastening finger portions 34 are all integrally formed as a one-piece, unitary member utilizing conventional manufacturing techniques such as stamping or casting. Of course, the crank portion 32 can be a separate piece from the hub portion 30. Preferably, crank arm 14 is constructed of a lightweight metallic material such as titanium, an aluminum alloy or stainless steel.

As seen in FIGS. 3, 5, 7 and 8, hub portion 30 has a center bore 40 for non-rotatably receiving the end of the spindle 18a of the bottom bracket 18 therein. Preferably, bore 40 has a non-circular cross-section which mates with the end of the spindle 18a of the bottom bracket 18. For example, bore 40 can be splined to mate with splines of the spindle 18a of the bottom bracket 18. Of course, it will be apparent to those skilled in the art from this disclosure that other known shapes can be utilized. Hub portion 30 is fixedly coupled to the bottom bracket 18 via a conventional crank bolt 42 in a substantially conventional manner. Accordingly, rotation of hub portion 30 causes the bottom bracket 18 to rotate therewith. The front surface of hub portion 30 is preferably smooth and blends into the crank portion 32 and the fastening finger portions 34. The rear surface of hub portion 30 has an annular flange 44 surrounding the bore 40.

The crank portion 32 has an inner end 50 integrally formed with the hub portion 30 and a free outer end 52 with a mounting hole 54 formed therein for attaching one of the pedals 22 thereto. Preferably, the mounting hole 54 is threaded to fixedly couple one of the pedals 22 thereto in a conventional manner.

The fastening finger portions 34 extend radially outwardly from the hub portion 30 to free ends 60. Thus, the fastening finger portions 34 form a spider that the chainrings 20 and 21 are coupled to, as seen in FIGS. 3 and 4. In particular, the free end 60 of each fastening finger 34 has an axially extending mounting hole 62 for securing the chainrings 20 and 21 thereto via fasteners 64. Preferably, fasteners 64 are conventional fasteners with their shaft portions having longitudinal axes B that are substantially parallel to the center axis A. For example, the fasteners 64 can be chainring mounting bolts with washers and/or ring nuts which are commonly used to couple the chainring to the fastening finger portions of a crank arm. Fasteners 64 are preferably constructed of a lightweight material such as an aluminum alloy or titanium. Of course, other types of fasteners and/or materials can be utilized.

Figures 5, 6:
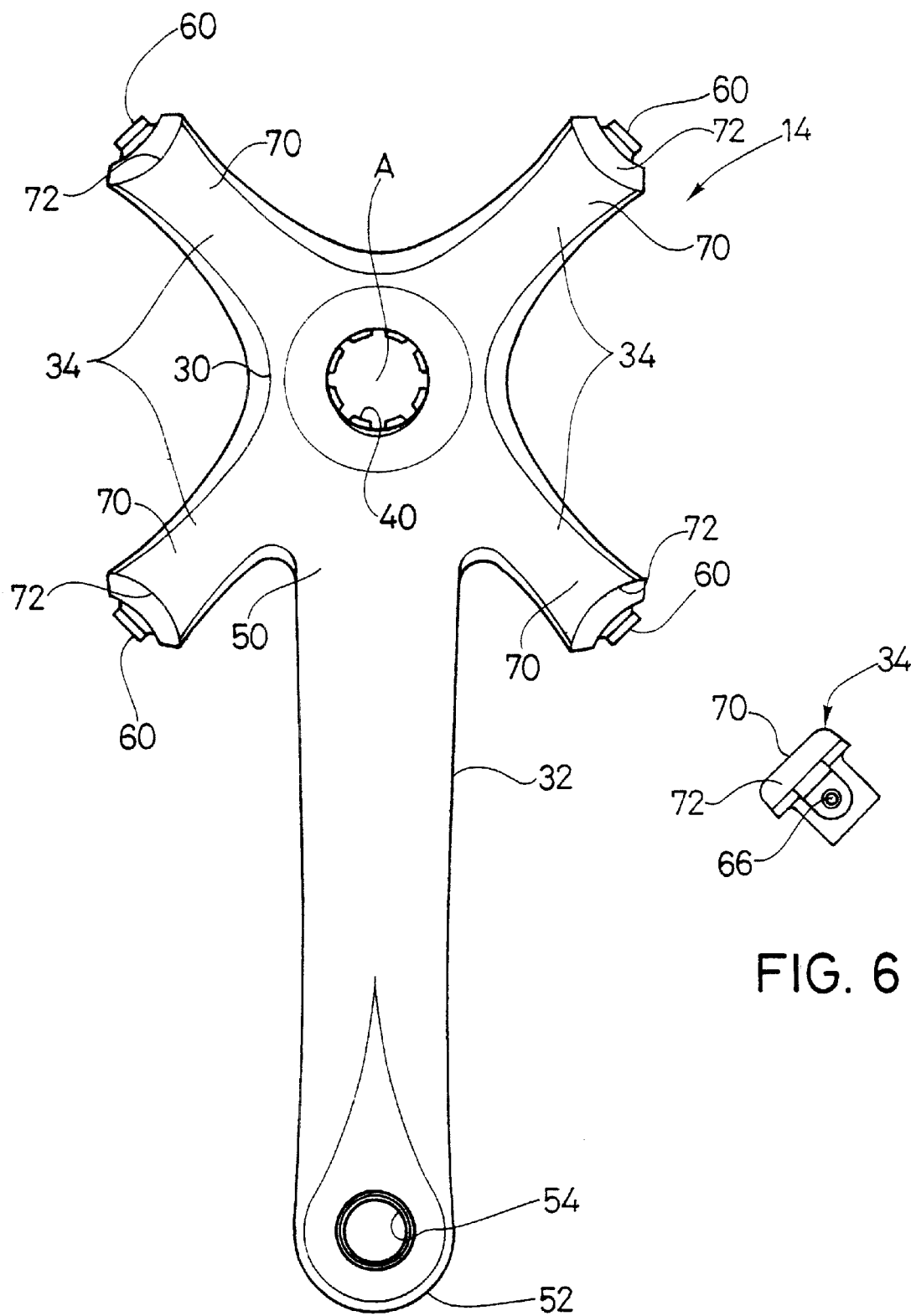
FIG. 5 is a front side or outside elevational view of the right crank arm illustrated in FIGS. 2 and 3.
FIG. 6 is an end elevational view of one fastening finger portion of the right crank arm illustrated in FIG. 5.
Figure 7:
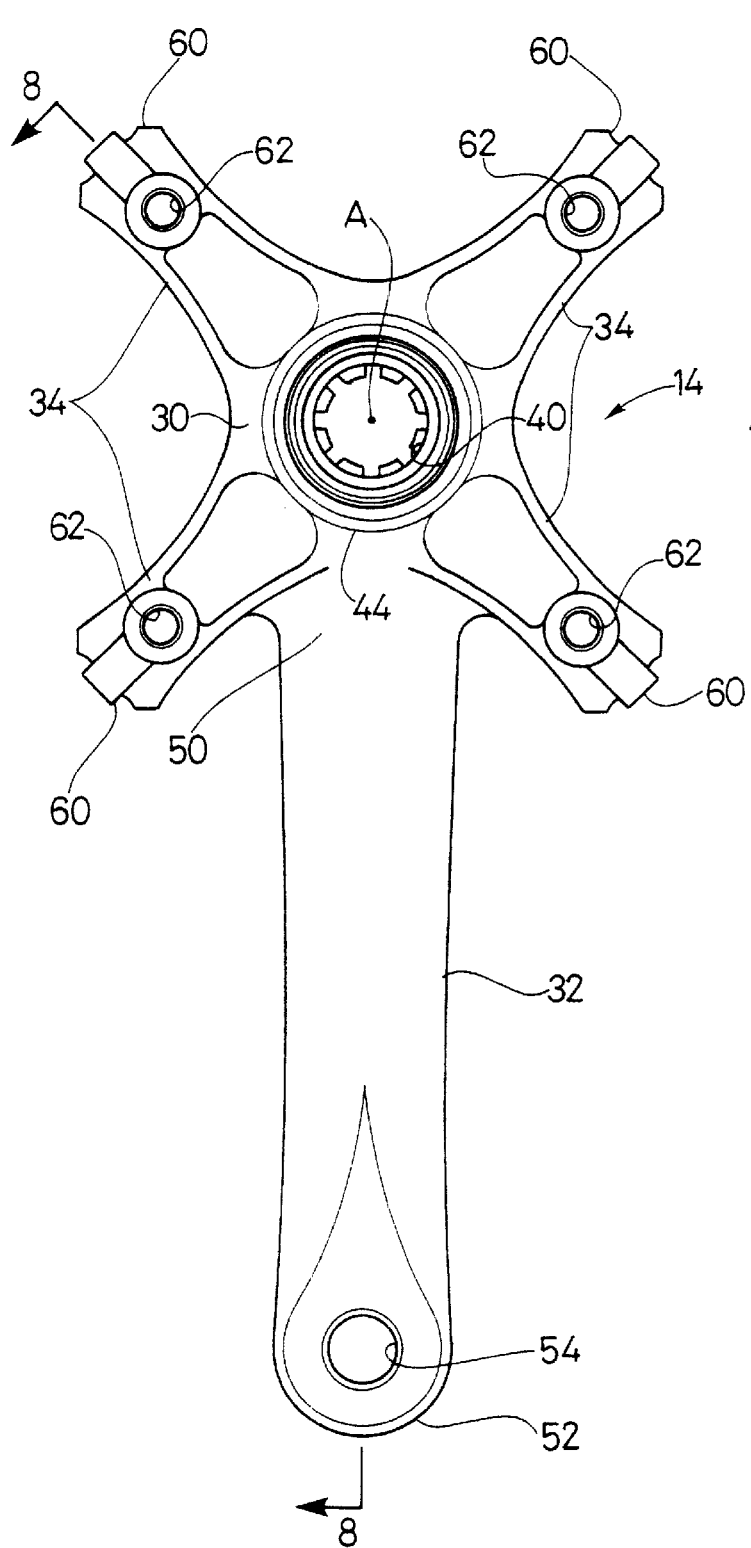
FIG. 7 is a rear or inside elevational view of the right crank arm illustrated in FIGS. 5 and 6.
Figure 8:
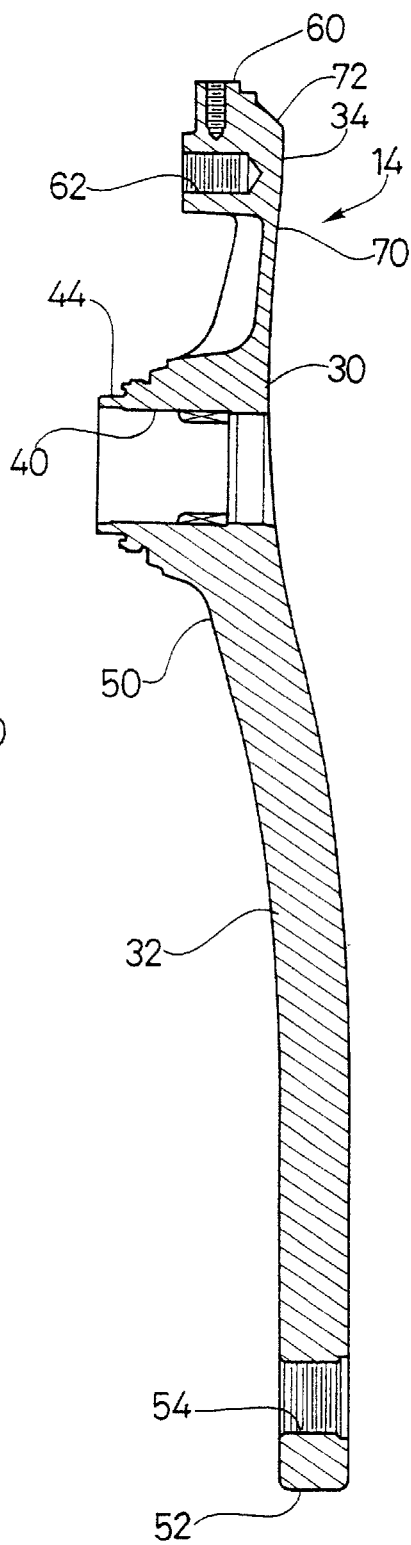
FIG. 8 is a cross-sectional view of the right crank arm illustrated in FIGS. 2–6 as viewed along section line 8—8 of FIG. 7.

As seen in FIGS. 6 and 8, each of the fastening finger portions 34 also have a threaded bore 66 at its free end 60. The threaded bore 66 receives a threaded fastener or bolt 68 therein to attach the cover 24 to the free ends 60 of the fastening finger portions 34. The threaded bores 66 have longitudinal center axes C that extend radially inwardly to the center axis of rotation A. Accordingly, the center axes C of the fasteners 68 extend substantially perpendicular to the axis of rotation and to the axes of the fasteners 64 of the chainrings 20 and 21. Preferably, the fasteners 68 have washers 69 located on their shafts. Of course, it will be apparent to those skilled in the art from this disclosure that other types of fasteners could be utilized for attaching the cover 24 to the fastening finger portions 34. For example, a bayonet type of fastening system could be utilized or any other suitable fastening system that will carry out the present invention. Moreover, the fastening finger portions 34 can have a threaded shaft extending outwardly therefrom with a nut located thereon.

As seen in FIGS. 4 and 5, the fastening finger portions 34 are preferably equally spaced apart about the hub portion 30, i.e., the fastening finger portions 34 are spaced 90° apart. Of course, while four of the fastening finger portions 34 are illustrated, it will be apparent to those skilled in the art from this disclosure that fewer or more fastening finger portions 34 could be utilized. For example, the crank arm 14 can be constructed with three or five fastening finger portions, which are equally spaced apart about the center of the hub portion 30.

As seen in FIG. 4, the front surfaces of fastening finger portions 34 have a contoured section 70 with a curved outer peripheral edge 72 that blends into the cover 24. Each contoured section 70 is curved along the length of its fastening finger portions 34 between its free end 60 and hub portion 30. At hub portion 30, contoured sections 70 blends smoothly into hub portion 30 and into crank portion 32. Preferably, the free ends 60 are recessed from the respective contoured section 70 of the front surface of the respective fastening finger 34 such that a smooth transition occurs between the contoured sections 70 of fastening finger portions 34 and the cover 24.

Figure 9:
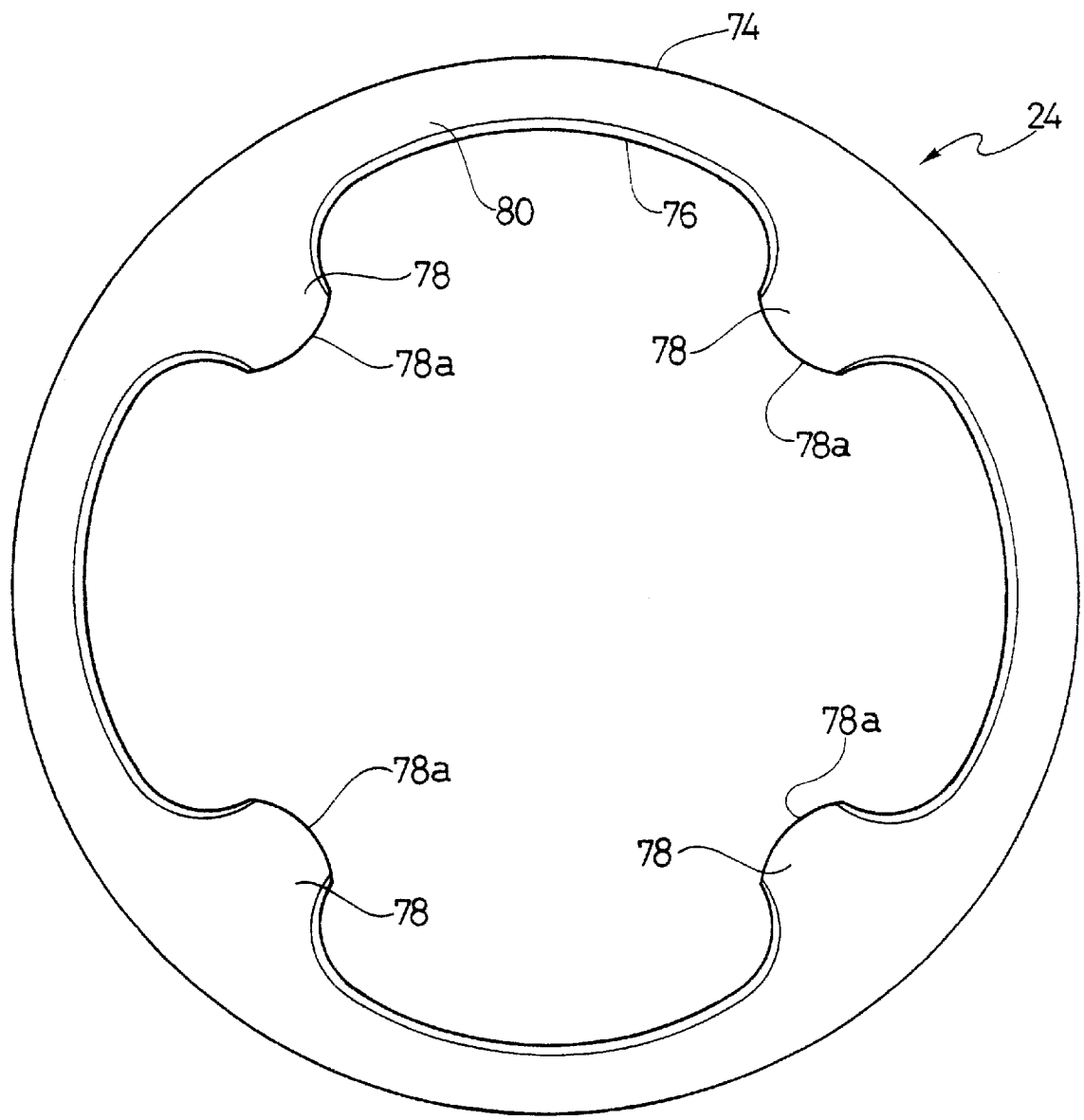
FIG. 9 is an outside or front side elevational view of the cover illustrated in FIGS. 2–4.
Figure 10:
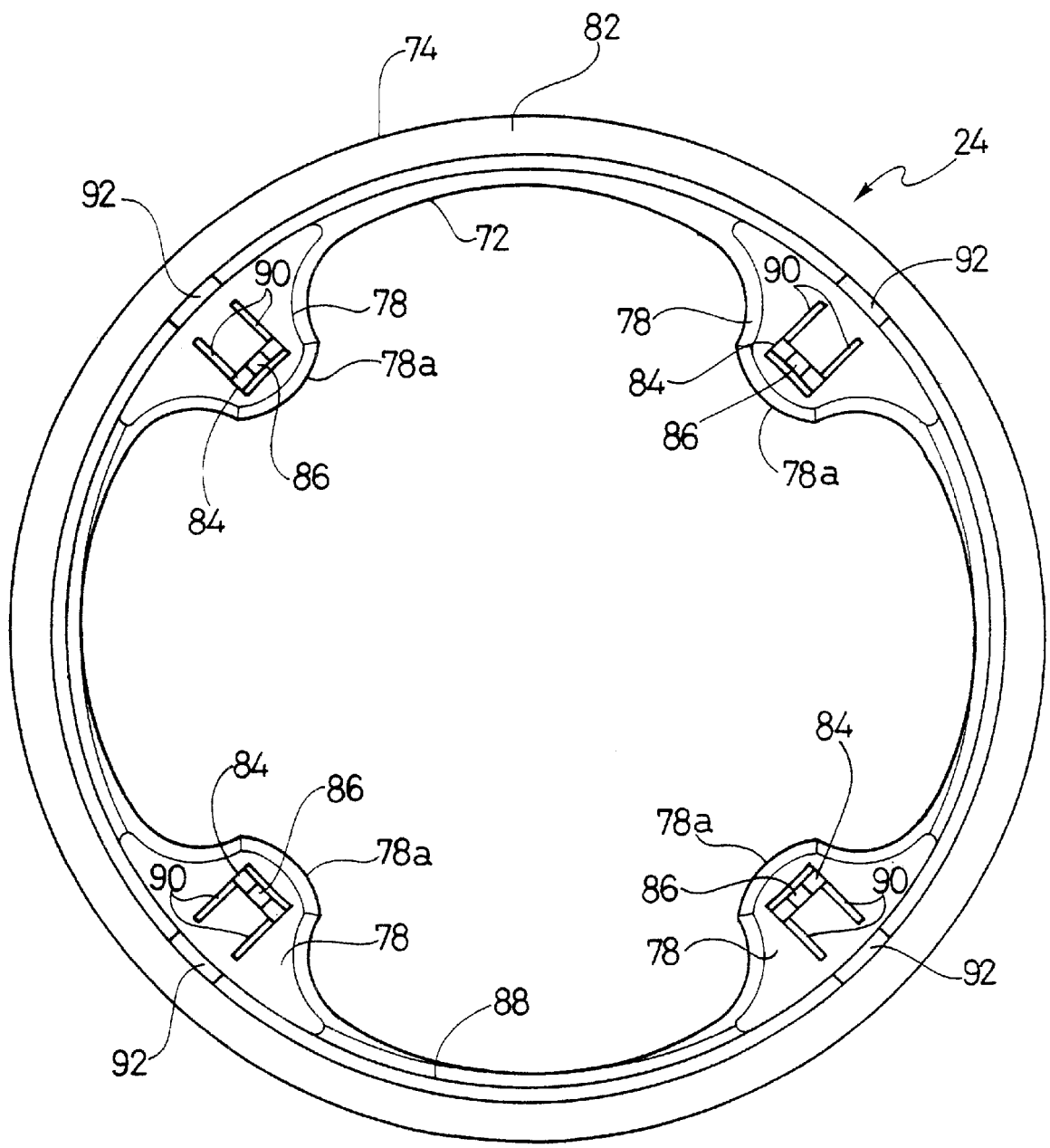
FIG. 10 is an inside or rear side elevational view of the cover illustrated in FIGS. 2–4 and 9.

As seen in FIGS. 9 and 10, preferably, the cover 24 is constructed as a one-piece, unitary member from a suitable rigid material. Preferably, the material is a lightweight material, such as a non-metallic material. One possible material for constructing the cover 24 is a plastic material such as rayon or other suitable plastic materials.

Cover 24 is preferably an annular member. The outer peripheral edge or portion 74 of the cover 24 is preferably circular and slightly larger than the diameter of the largest chainring 21. The inner peripheral edge 76 of the cover 24 has four inwardly projecting portions 78 that correspond to the fastening finger portions 34. These inner projections 78 each have a curved surface 78a that mates with a curved outer surface 72 of the fastening finger portions 34. Preferably, the inner peripheral edge of these projections 78 are angled so as to meet with a corresponding angle or inclined surface of the free ends 60 of the fastening finger portions 34.

The cover 24 has an annular front surface 80 and an annular rear surface 82. The front surface 80 of the cover 24 is preferably curved such that the curvature meets with the curvature of the fastening finger portions 34 to provide a smooth transition between the fastening finger portions 34 and the front surface 80 of the cover 24. The rear surface 82 of the cover 24 has a plurality of mounting portions 84 with mounting openings 86 and an annular rim portion 88 located radially outwardly of the mounting portions 84.

The protective cover 24 is designed to provide an attractive appearance (smooth look), as well as to prevent wobbling of the protective cover 24. In particular, the protective cover 24 is independently adjustable to each of the fastening finger portions 34 with the fasteners 68 being hidden behind the cover 24. This independent adjustment allows the outer peripheral edge 74 of cover 24 to be spaced a constant distance from a center plane of the bicycle 10. In other words, the cover 24 is independently adjustable in the axial direction at each of the fastening finger portions 34 to correct for any distortion in the protective cover 24. Moreover, this independent adjustment of the cover 24 ensures that a very smooth transition occurs between the front surfaces of the fastening finger portions 34 and the front surface 80 of the inner projections 78 of the cover 24. In other words, since the cover 24 is axially adjustable, the inner edges of the curved surfaces 78 of the cover 26 can be aligned in the radial direction with the curved outer peripheral edges 72 of the fastening finger portions 34. Thus, a "smooth look" is formed between the fastening finger portions 34 and the cover 24. Moreover, the location of the fasteners 68 allows for more freedom in design of the fastening finger portions 34.

In this embodiment, the mounting portions 84 are axially extending flanges that extend in a substantial axial direction. Two braces 90 are provided between the rear surface 82 of the cover 24 and each of the mounting portions 84 to provide additional strength to the mounting portions 84. Preferably, the mounting openings 86 of the mounting portions 84 are open-ended, U-shaped slots that extend to the free edge of the mounting portions 84. These open-ended slots or mounting openings 86 allow the cover 24 to be easily installed and adjusted relative to the fastening finger portions 34. Thus, the cover 24 can be axially adjusted relative to the fastening finger portions 34. Of course, it will be apparent to those skilled in the art from this disclosure that the mounting openings 84 could be closed slots or circular openings.

As best seen in FIGS. 10 and 12–14, the rim portion 88 is located radially outwardly of the mounting portions 84 and is discontinuous at the mounting portions 84. In other words, the rim portion 88 has four cutouts 92 located radially above the mounting openings of the mounting holes. These cutouts 92 provide access to the fasteners 68. In other words, the tool, e.g., screwdriver, can be inserted through the cutouts to rotate the fasteners 68 as seen in FIG. 14.

As seen in FIGS. 3 and 4, the rim portion 88 is circumferentially arranged on the rear surface 82 of the cover 24 and extends axially towards the largest chainring 21 adjacent the teeth portion of the largest chainring 21. Preferably, the space between the free end of the rim portion 88 and the teeth of the large chainring 21 is smaller than the width of the chain 26 so that chain 26 will not drop down therethrough.

Second Embodiment

Figure 15:
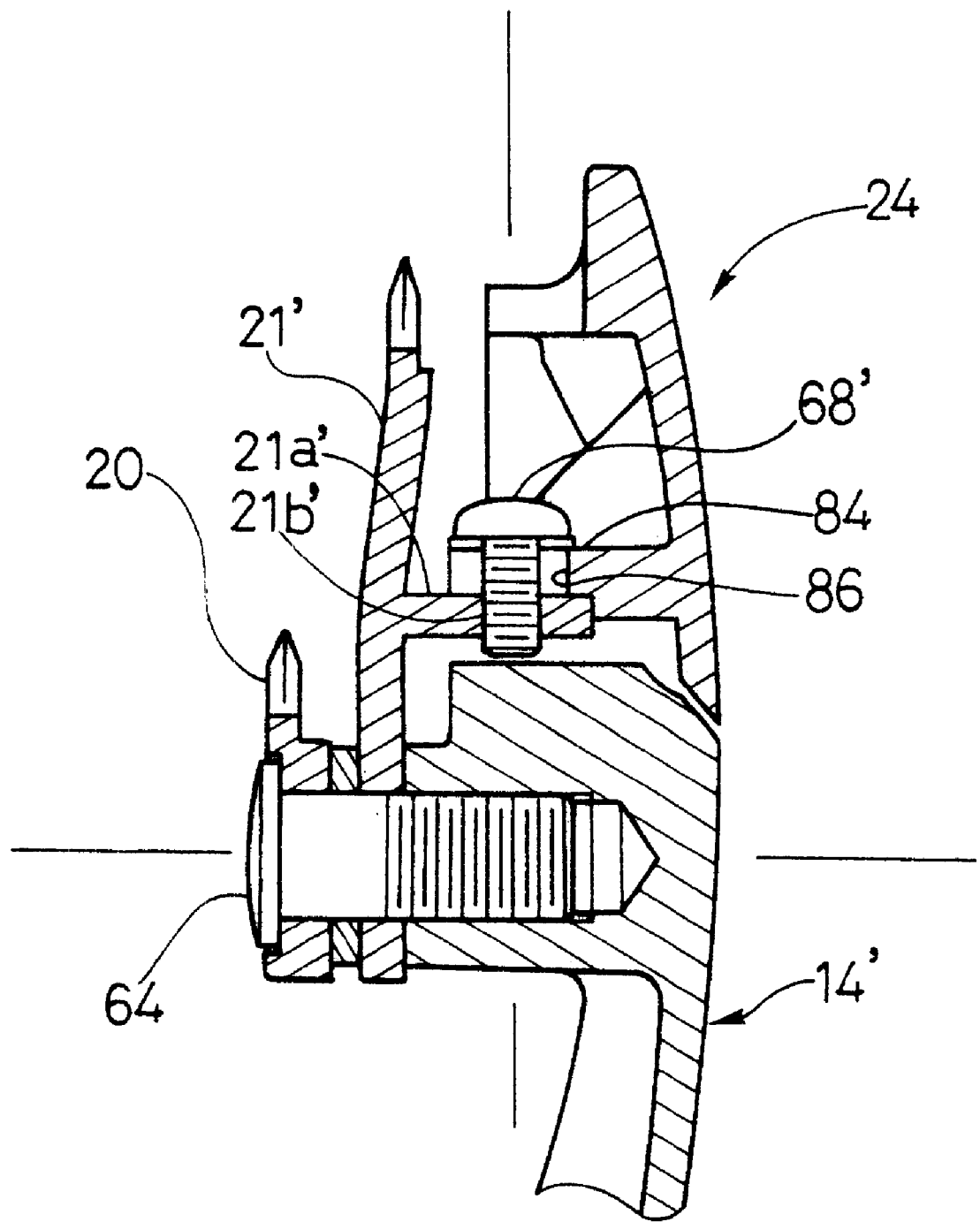
FIG. 15 is a partial cross-sectional view of a front chainwheel assembly in accordance with a second embodiment of the present invention.

Referring now to FIG. 15, a bicycle front chainwheel assembly in accordance with a second embodiment of the present invention is illustrated. In this second embodiment, the front chainwheel assembly is basically formed of the crank arm 14', the chainrings 20 and 21' and the cover 24. Thus, all of the parts of this embodiment are identical to the first embodiment, except that the largest chainring 21 of the first embodiment has been replaced with the modified chainring 21' that uses shorter fasteners 68' and the free ends 60' of the crank arm 14' has been changed.

The largest chainring 21' of this embodiment is identical to the largest chainring 21 of the first embodiment, except that four axially extending flanges or cover attachment portions 21a' (only one shown) are provided on the exteriorly facing surface of chainring 21'. The cover attachment portions 21a' (only one shown) are spaced 90° apart and each have a threaded mounting hole 21b' therein for coupling the cover 24 thereto via four fasteners 68'. The crank arm 14' of this embodiment is identical to the crank arm 14 of the first embodiment, except that the portion with the threaded holes 66 have been eliminated.

In view of the similarities between this embodiment and the first embodiment, this embodiment will not be discussed or illustrated in detail herein. Rather, it will be apparent to those skilled in the art from this disclosure that the construction and explanation of the first embodiment can be employed in the construction of this embodiment without undue experimentation.

Third Embodiment

Figure 16:
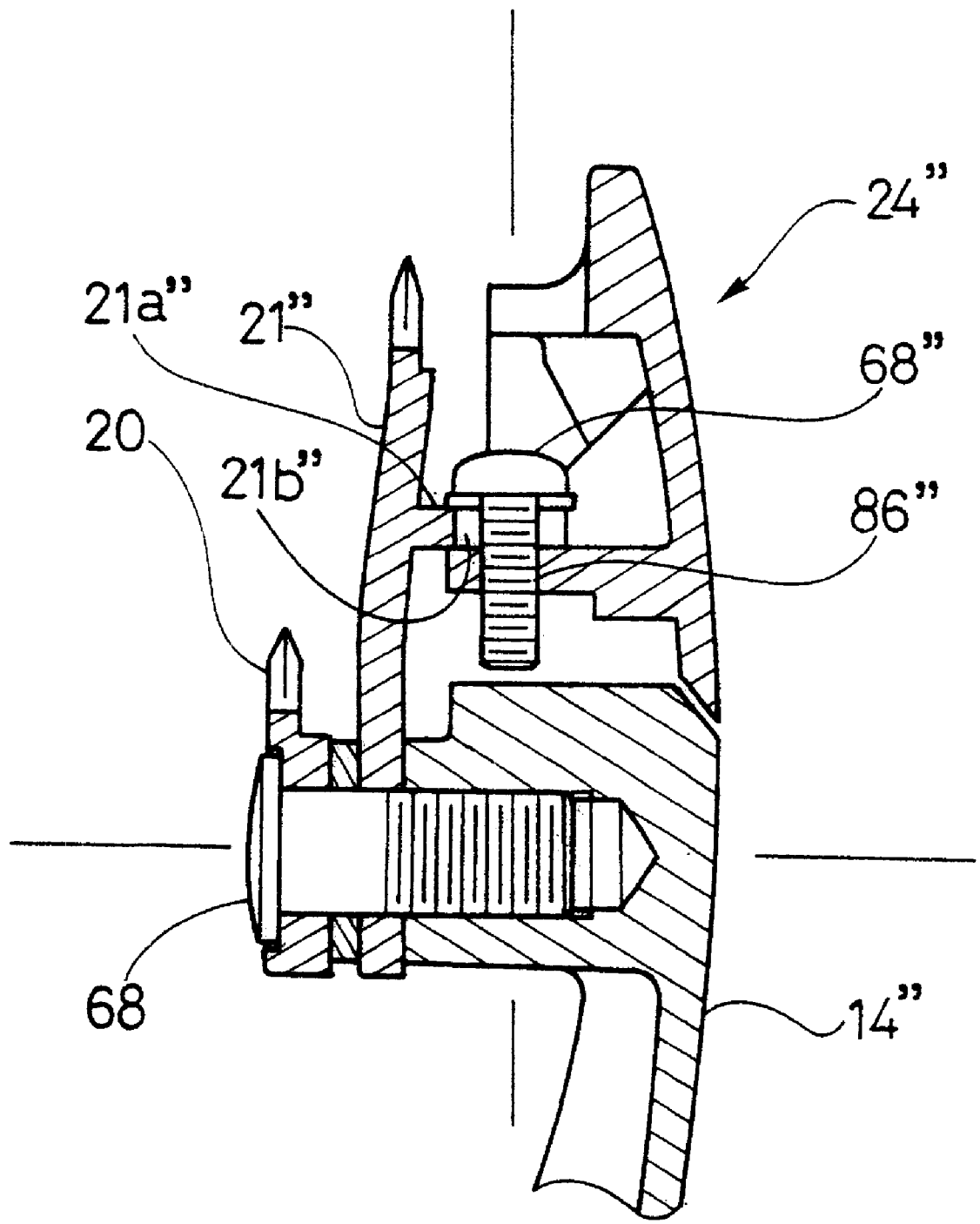
FIG. 16 is a partial cross-sectional view of a front chainwheel assembly in accordance with a third embodiment of the present invention.

Referring now to FIG. 16, a bicycle front chainwheel assembly in accordance with a third embodiment of the present invention is illustrated. In this third embodiment, the front chainwheel assembly is basically formed of the crank arm 14", the chainrings 20 and 21" and the cover 24". Thus, all of the parts of this embodiment are identical to the first embodiment, except for the connection between the chainring 21" and the cover 24".

The largest chainring 21" of this embodiment is identical to the largest chainring 21 of the first embodiment, except that four axially extending flanges or cover attachment portions 21a" (only one shown) are provided on the exteriorly facing surface of chainring 21". The cover attachment portions 21a" (only one shown) are spaced 90° apart and each have an open ended slot or mounting hole 21b" therein for coupling the cover 24" thereto via four fasteners 68". Thus, cover attachment portions 21a are identical to the mounting portions 84 but coupled to the chainring 21" instead of the cover 24. The crank arm 14' of this embodiment is identical to the crank arm 14 of the first embodiment, except that the portion with the threaded holes 66 have been eliminated. Likewise, the cover 24" is identical to the cover 24 of the first embodiment, except that the mounting openings have been modified from U-shaped slots to threaded bores 86".

In view of the similarities between this embodiment and the first embodiment, this third embodiment will not be discussed or illustrated in detail herein. Rather, it will be apparent to those skilled in the art from this disclosure that the construction explanation of the first embodiment can be employed in the understanding of the construction of this third embodiment without undue experimentation.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle front chainwheel assembly comprising:
   a gear portion configured to be coupled to a bottom bracket for rotation therewith about an axis of rotation, said gear portion having a plurality of cover attachment portions extending axially outwardly from said gear portion to free ends; and
   a cover having mounting portions coupled to said cover attachment portions by fasteners having a shaft portion extending substantially perpendicular to said axis of rotation.

2. A bicycle front chainwheel assembly according to claim 1, wherein
   said mounting portions have mounting openings formed therein.

3. A bicycle front chainwheel assembly according to claim 2, wherein
   said mounting openings are open ended slots.

4. A bicycle front chainwheel assembly according to claim 3, wherein
   said shaft portions of said fasteners are threadedly received in threaded holes formed in said cover attachment portions.

5. A bicycle front chainwheel assembly according to claim 2, wherein
   longitudinal center lines of said mounting openings pass through said axis of rotation.

6. A bicycle front chainwheel assembly according to claim 1, wherein
   said cover attachment portions have attachment openings formed therein.

7. A bicycle front chainwheel assembly according to claim 6, wherein
   said attachment openings are open ended slots.

8. A bicycle front chainwheel assembly according to claim 7, wherein
   said shaft portions of said fasteners are threadedly received in threaded holes formed in said mounting portions.

9. A bicycle front chainwheel assembly according to claim 6, wherein
   longitudinal center lines of said attachment openings pass through said axis of rotation.

\* \* \* \* \*